(12) United States Patent
Cipollone et al.

(10) Patent No.: US 11,279,387 B2
(45) Date of Patent: Mar. 22, 2022

(54) TRAIN DIRECTION DETECTION APPARATUS AND METHOD

(71) Applicant: VOSSLOH SIGNALING, INC., Cleveland, OH (US)

(72) Inventors: John Cipollone, Vacaville, CA (US); Martin Smaha, Vacaville, CA (US)

(73) Assignee: VOSSLOH SIGNALING, INC., Cleveland, OH (US)

( * ) Notice: Subject to any disclaimer, the term of this patent is extended or adjusted under 35 U.S.C. 154(b) by 0 days.

(21) Appl. No.: 15/300,833

(22) PCT Filed: Mar. 31, 2015

(86) PCT No.: PCT/US2015/023672
§ 371 (c)(1),
(2) Date: Sep. 30, 2016

(87) PCT Pub. No.: WO2015/153661
PCT Pub. Date: Oct. 8, 2015

(65) Prior Publication Data
US 2017/0021846 A1 Jan. 26, 2017

Related U.S. Application Data

(60) Provisional application No. 61/973,112, filed on Mar. 31, 2014.

(51) Int. Cl.
*B61L 25/02* (2006.01)
*G01C 21/20* (2006.01)
*B61L 29/28* (2006.01)

(52) U.S. Cl.
CPC ............ *B61L 25/023* (2013.01); *B61L 25/025* (2013.01); *B61L 29/284* (2013.01); *B61L 29/286* (2013.01); *G01C 21/20* (2013.01)

(58) Field of Classification Search
CPC ........ B61L 25/00; B61L 25/02; B61L 25/021; B61L 25/023; B61L 25/025; B61L 29/28; B61L 29/284; B61L 29/286; G01C 21/20
See application file for complete search history.

(56) References Cited

U.S. PATENT DOCUMENTS

| | | | | |
|---|---|---|---|---|
| 3,333,096 A | * | 7/1967 | Ohman ................. | B61L 29/286 246/122 R |
| 3,752,426 A | * | 8/1973 | Pal .......................... | B61L 1/187 246/249 |
| 3,838,271 A | * | 9/1974 | Ackard ................. | B61L 29/286 246/125 |
| 4,307,860 A | * | 12/1981 | Kuhn ................... | B61L 29/286 246/125 |
| 5,129,605 A | * | 7/1992 | Burns ................... | B61L 25/021 246/122 R |

(Continued)

*Primary Examiner* — Huy Q Phan
*Assistant Examiner* — David B Frederiksen
(74) *Attorney, Agent, or Firm* — Michael G. Monyok

(57) ABSTRACT

The present invention relates generally to a train direction detection device and a method of determining the direction of travel. The train direction detection device analyzes the characteristics, such as impedance, of an electrical circuit implemented on a railroad to determine the direction of approach of a train. The invention is adapted to integrate with occupancy or grade crossing circuits commonly used by railroads at grade crossings.

11 Claims, 3 Drawing Sheets

(56) References Cited

U.S. PATENT DOCUMENTS

| | | | | |
|---|---|---|---|---|
| 5,417,388 A * | 5/1995 | Stillwell | ............... | A63H 19/24 246/122 A |
| 6,179,252 B1 * | 1/2001 | Roop | ..................... | B61L 29/18 246/122 R |
| 6,241,197 B1 * | 6/2001 | Harland | ............... | B61L 29/224 246/125 |
| 6,292,112 B1 * | 9/2001 | Bader | .................. | B61L 29/284 246/202 |
| 6,371,417 B1 * | 4/2002 | Southon | ................. | B61L 1/165 246/247 |
| 6,386,486 B1 * | 5/2002 | Speranza | ............... | B61L 29/28 246/122 R |
| 7,075,427 B1 * | 7/2006 | Pace | ....................... | B61L 23/06 246/125 |
| 2004/0181321 A1 * | 9/2004 | Fries | .................... | B61L 29/226 701/19 |
| 2006/0202860 A1 * | 9/2006 | Tsai | ......................... | B61L 1/18 340/870.28 |
| 2008/0067293 A1 * | 3/2008 | Fries | ....................... | B61L 1/181 246/293 |
| 2008/0169385 A1 * | 7/2008 | Ashraf | ................... | B61L 29/22 246/130 |
| 2009/0090818 A1 * | 4/2009 | Kumar | ................... | B61L 3/006 246/186 |
| 2010/0174427 A1 * | 7/2010 | Sivasubramaniam | .. | B61L 3/006 701/19 |
| 2010/0204856 A1 * | 8/2010 | Smith | .................... | B61C 17/12 701/19 |
| 2011/0011985 A1 * | 1/2011 | Hogan | ................... | B61L 1/188 246/34 R |
| 2011/0174934 A1 * | 7/2011 | Kikuchi | ................. | B61L 1/187 246/122 R |
| 2014/0012438 A1 * | 1/2014 | Shoppa | .................. | B61L 1/188 701/19 |
| 2014/0319286 A1 * | 10/2014 | Hogan | ................. | B61L 29/226 246/122 R |
| 2015/0158510 A1 * | 6/2015 | Fries | ....................... | B61L 1/20 701/19 |

* cited by examiner

TRAIN DIRECTION DETECTION APPARATUS AND METHOD

CROSS-REFERENCE TO RELATED APPLICATIONS

This application claims the benefit under 35 U.S.C. § 119 of U.S. Provisional Application Ser. No. 61/973,112, filed Mar. 31, 2014, which is incorporated by reference herein in its entirety.

STATEMENT REGARDING FEDERALLY SPONSORED RESEARCH

Not applicable.

BACKGROUND OF THE INVENTION

The invention relates generally to a device and method used to detect the direction of approach of a train entering a grade crossing. More specifically, the invention relates to a device that utilizes signals generated by a track occupancy or grade crossing prediction circuit to determine the direction of travel of a train located within the circuit.

Most railroad grade crossing systems in service today provide safe and reliable warning for highway traffic of incoming train traffic. The G.E. Transportation HXP-3 and Global Rail Systems Model CWL-7 are examples of approved warning systems that have been widely adopted by the rail industry. These systems, and others like them, comprise electrical circuits that utilize the rails as part of the circuit. As a train enters the circuit, the electrical characteristics of the circuit are altered. The changes are recognized by a control unit, which in turn warns crossing highway traffic of the train's approach.

These types of warning systems work by transmitting an electrical signal through the rails and monitoring changes in the signal as a train travels along the rails comprising the circuit. The electrical circuit consists of a transmitter in contact with the rails and a receiver, also in contact with the rails at a distance from the transmitter. The receiver and transmitter are separated by a distance in order to provide adequate warning time for a train traveling within a known velocity or an anticipated range of velocities. When a train enters the track circuit, it alters the characteristics of the electrical signals, typically impedance, as received by the receiver. The micro-processor based system interprets this change as a train being present. Stated differently, a train traveling along the rails will alter the impedance of the circuit because the train's wheels and axles are electrically conductive, effectively shortening the circuit as the train approaches the crossing. The system recognizes the short circuit as the presence of a train.

While the system is capable of detecting the presence of a train, a standalone system of the type described cannot determine the direction of travel of the train. If multiple detection systems are linked, it would be possible to determine direction of travel based on the order in which each system detects the presence of a train. However, current independent systems do not provide direction detection functionality.

This lack of functionality is a disadvantage during testing of the system, which is required by law on a periodic basis. The testing, which can be mandated as often as monthly, must be performed for rail traffic in both directions of travel. During performance tests, train movement is simulated in both directions and recorded in the system's record log. However, because detection systems cannot differentiate direction of movement, separate manual records are required to catalog the direction of travel during testing. This testing requirement significantly adds to the cost of testing the detection systems. For railroads that have hundreds or thousands of crossings, the additional costs are significant. In addition to logging direction data for performance tests, railroads have an interest in capturing direction data to assist in accident investigations. It would therefore be advantageous to develop a system that is compatible with existing track occupancy circuits and grade crossing warning systems that has the ability to determine and log direction of travel when a train is detected.

BRIEF SUMMARY OF THE INVENTION

The system and method of the present invention provides the direction of travel of a train traveling through a detection or grade crossing circuit by analyzing the rate of change of signals generated by the circuit. The system works with existing detection circuits, such grade crossing detection systems. Alternatively, the system can be implemented as a stand-alone system.

In one embodiment, the invention is disclosed as a system that analyzes the signals generated by existing train detection systems. Typical detection systems generate an audio frequency current through the use of a transmitter connected to the rails. A separate receiver located a distance from transmitter receives the signal. The detection system monitors the signal for any changes caused by the presence of a train. The presence of a train in the track circuit is detected by the system a simple yes or no data point. If a train is detected, a warning system at the grade crossing is activated.

The system of the present invention receives and analyzes the signals generated by the detection system to further determine the direction of travel of the train. More specifically, the system analyzes the rate of change of the signals over a period of time as the train approaches the grade crossing. The system then compares the rate of change to a reference value for a known direction of travel. In one embodiment, the signal is the impedance of the circuit, but other characteristics of the electrical circuit can be used.

By way of example, when a train passes near the receiver, the detection circuit signal peaks. This peak will be present regardless of the train's direction of approach. However, a train approaching from one direction will cause the signal to gradually rise before peaking, then drop sharply as the train exits the circuit. On the other hand, a train approaching from the opposite direction will create an abrupt peak in the measured signal, with the signal slowly tapering as the train exits. The difference is attributable to the difference in locations of the transmitter and receiver relative to the train for each direction of travel.

The system of the present invention captures the electrical signal generated by the detection system and processes the signal to determine the approach direction based on the trend in the signal. The system of the present invention can then send a data point indicating the direction of travel to the existing detection system for inclusion in its data log or record the data directly.

DETAILED DESCRIPTION OF THE INVENTION

Figure 1:
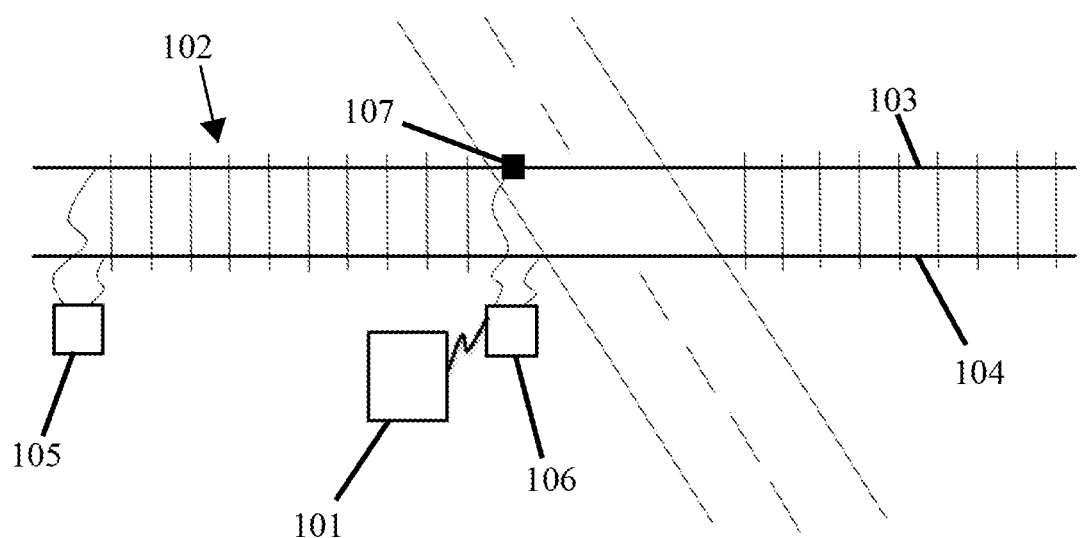
FIG. 1 depicts the train direction detection apparatus according to one embodiment.

The present invention is comprised of a train direction detection module 101 in electrical communication with a track circuit 102, as shown in FIG. 1. The track circuit, in the preferred embodiment, is comprised of a transmitter 105 and a receiver 106 electrically connected to one or more of a pair of rails 103 and 104, where the rails 103 and 104 comprise a portion of the electrical circuit. In alternative embodiments, the electrical connection between the track circuit 102 and module 101 can be accomplished via a pickup coil set 107 mounted to a rail. The pickup coil set 107, such as a B-Point Coupler manufactured by Global Rail Systems, Inc., receives audio frequency signals sent from the transmitter 105. The transmitter 105 can be part of a pre-existing track circuit 102, such as a detection system or grade crossing system. When the pickup coil set 107 receives the audio frequency current, a signal is generated and transmitted to the train direction detection module 101. Upon receiving the signals, the module processes the signals, as described herein, to determine direction.

The module 101 consists of a standard processor platform or computer that receives data and analyzes that data to determine the direction of travel. More specifically, the module 101 analyzes the shape of a change in the data over a period of time as a train approaches the crossing. In the preferred embodiment, the module 101 utilizes software to analyze the signals. A person having skill in the art will appreciate that various algorithms can be employed in the software to recognize the shape of the waveform of the signals.

In one embodiment, the module 101 is further comprised of an ADC converter and an amplifier circuit. The purpose of this circuit is to prepare the signals received from the pickup coils 107 for further processing by the module 101. The module 101 can also contain a control chip circuit which allows an installer or other user to interface with the system. The module 101 can also include a memory chip, 3.3v power supply for the processor, and a physical output circuit. While an exemplary embodiment has been described, the module 101 can comprise any electronic device capable of receiving a signal, processing the data, and storing the results in memory.

In the preferred embodiment, the train detection module 101 is part of an integrated track circuit 102. At many grade crossings, several signals are transmitted through the rails. By utilizing the signals of an existing circuit, the system does not inject additional signals that could cause interference or other issues. That is, the system does not add a signal where there are already many pre-existing signals present. As a result, no added frequency management is necessary when implementing the system. In installations where many signals are present on the track, a filter can be used to isolate the desired signal.

In an alternative embodiment, the train detection module 101 is a separate component that is capable of sending a signal to an existing grade crossing data logging system. In this embodiment, the train direction detection module 101 has two 12 VDC outputs, for example, that connect directly into pre-existing grade crossing data logging systems. One output is active for movement in one direction, and the other output is active for movement in the opposite direction. These two added data points are then recorded concurrently with other crossing activity already being logged by the motion detection system.

It should be noted that the system of the present invention can be installed anywhere on a rail line and is not limited to installation at a grade crossing. In installations where the system is not used in connection with an existing track circuit 102, the system will further comprise a transmitter 105 for generating a signal and a receiver 106 for acquiring the signal.

Figure 3:
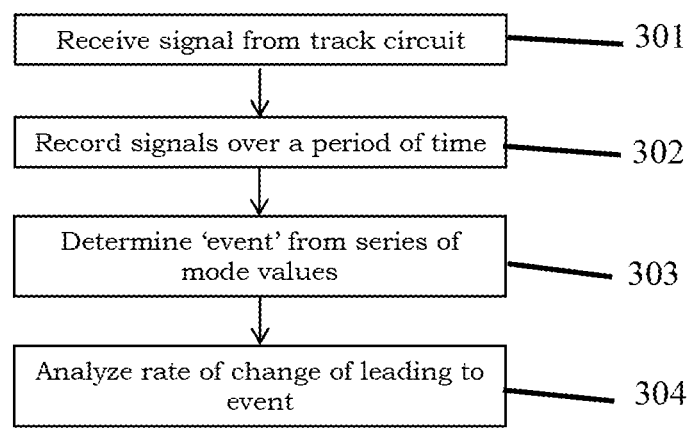
FIG. 3 is a flow diagram of a method of the present invention.

To accurately determine the direction of travel of a train, the train detection module 101 receives a signal, or data about the track circuit, from the pickup coil set 107 or receiver 106 at step 301 as shown in FIG. 3. In the preferred embodiment, a mode value is generated as the average of signals sampled over a period of time. For example, the signal can be sampled once every 50 milliseconds to generate a mode value over a period of 250 milliseconds. In other words, the mode value is the average of the five measurements taken during the 250 ms measurement period. The mode value provides a consistent reading, which enables the system to filter out noise and to cancel out certain frequency effects. In alternate embodiments, multiple pickup coil sets 107 are used to further eliminate noise. While 50 ms and 250 ms have been used as examples, any time period can be used for measurement intervals. A higher frequency of measurement improves data quality, but requires more memory and a faster processor in the module 101.

The mode value is recorded at step 302 in the memory of the module 101. If a mode value is not used, the signals are recorded directly at this step. After recording the data, the train detection module 101 evaluates trends in the data value over the previous 240 samples, or 60 seconds worth of data for mode values calculated on 250 ms intervals, to determine if an 'event' 201 has occurred. The event 201 is defined as the passing of a train and is determined at step 303. If an event 201 has occurred, the train detection module records the actual sampling data for a period of time before and after the event 201. The amount of data recorded can be varied depending on the requirements of the railroad using the system. If not event 201 has occurred in the sample period, the module continues logging data over a running sample period, discarding the oldest data.

Figure 2A:
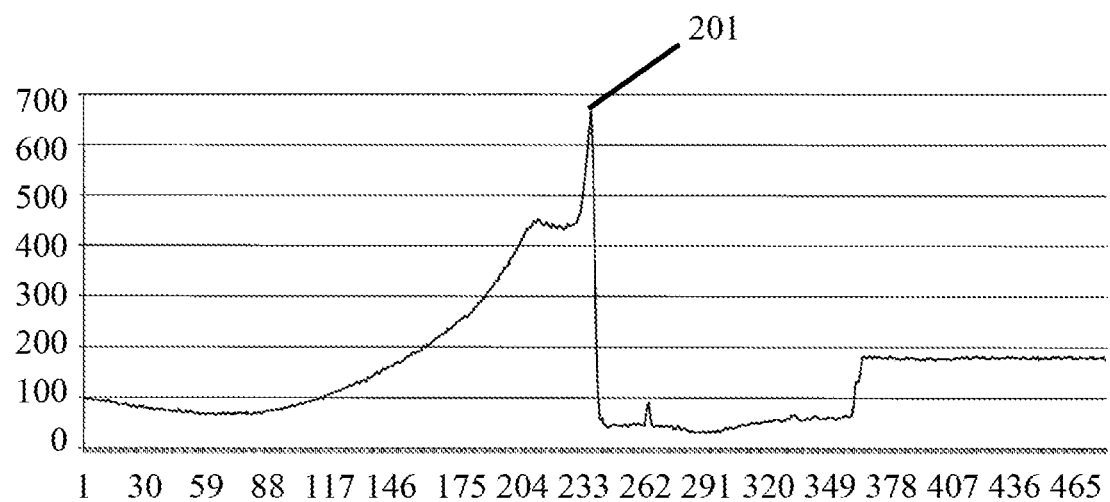
FIG. 2A is a graph showing the measurement of a detection circuit signal as a function of time for a train approaching from one direction.
Figure 2B:
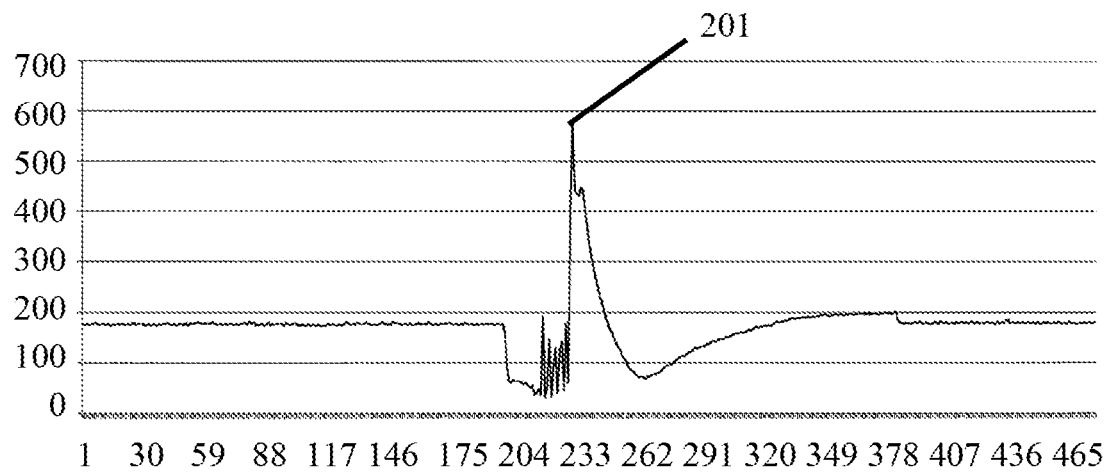
FIG. 2B is another graph showing the same measurement as FIG. 2A but for a train approaching from the opposite direction.

The event 201 is a peak in the series of signals, as can be seen in the middle of each graph in FIGS. 2A and 2B. The module 101 can detect the event 201 by various methods. In one embodiment, the event 201 is identified simply as the maximum value during the sample period. In alternative embodiments, the event 201 is identified when the signal crosses a threshold level. The threshold value is determined during installation of the train detection system by intentionally shorting the track circuit 102 to imitate the shorting that occurs when a train passes through the circuit 102 or by recording a passing train. To ensure the event 201 is recorded accurately and without errors, the threshold level can be set at 80%, for example, of the measured level.

For each event, the train detection module 101 further processes the recorded data to determine which direction the train is travelling at step 304. The data on either side of the peak is the relevant data in determining the direction of travel. As further depicted in the graphs in FIGS. 2A and 2B, the slope of the curve leading to the event is different based on the direction of travel. For example, in FIG. 2A the slope for a train approaching from one direction is a gradual rise to the peak and then sharp fall on the other side of the peak. From the other direction of travel, as depicted in FIG. 2B, the signal rises abruptly to the peak before gradually trailing off.

Various methods can be used to determine whether the trend in the data indicates travel from one direction or the other. In one method, the rate of the change in the data is compared against a reference value. For example, a shunt can be placed on the tracks 103 and 104 at one end of the track circuit 102 to simulate a train entering the circuit from that direction. In another method, data is recorded during an actual train crossing and stored in the module 101 as the reference value. In another embodiment, the speed at which the signal is increasing is used to determine direction of travel. In this method, a rise to the peak over a short period of time, or an abrupt rise, indicates travel in one direction. A rise to the peak over a longer period of time indicates travel from the other direction. After the direction of travel has been determined, the module 101 can record the direction data set or send the data to an existing crossing system.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A system for determining a direction of travel of a train approaching a grade crossing comprising:
   a track circuit that generates an electrical current,
      wherein the circuit is partially comprised of a rail track,
      wherein the circuit generates a plurality of signals over a period of time which vary based on a location of the train within the circuit,
      wherein the plurality of signals comprise a single frequency electrical current;
   a pickup coil set mounted to the rail track for acquiring the plurality of signals; and
   a module in communication with the pickup coil set,
      wherein the module identifies an event in the plurality of signals, records the plurality of signals for a period of time before and after the event, and determines the direction of travel of the train based on a rate of change during the period of time in the plurality of signals.

2. The system of claim 1, wherein the module comprises:
   a processor that receives the plurality of signals as an input;
   a program executed by the processor,
      wherein the program calculates the rate of change in the plurality of signals acquired from the track circuit,
      wherein the program compares the rate of change to a reference rate of change for a given direction of travel,
      wherein the program generates a train direction result;
   a data storage medium for storing the plurality of signals and the train direction result.

3. The device of claim 1, wherein the track circuit is not interrupted by the grade crossing.

4. The device of claim 1, wherein the module identifies the event by identifying a peak in the plurality of signals.

5. The device of claim 1, wherein the module identifies the event by identifying whether the plurality of signals has crossed a threshold.

6. A train direction detection device, comprising:
   a transmitter adapted to be electrically coupled to a rail,
      wherein the transmitter generates an electrical signal at a single frequency and having a parameter;
   a receiver coupled to the rail,
      wherein the receiver detects the signal from the transmitter,
      wherein the presence of a train alters the signal parameter, and
      wherein the receiver comprises a pickup coil set;
   a module comprising a communications port and a processor, wherein the module acquires the signal detected by the receiver through the communications port;
   a program executed by the processor, wherein the program identifies an event in the signal, records data for a period of time before and after the event, and identifies a direction of travel of a train based on the signal parameter during the period of time.

7. The device of claim 6, wherein the signal is an audio frequency alternating current.

8. The device of claim 7, wherein the parameter is impedance.

9. The device of claim 6, wherein the rail is not interrupted by a grade crossing.

10. The device of claim 6, wherein the module identifies the event by identifying a peak in the signal.

11. The device of claim 6, wherein the module identifies the event by identifying whether the signal has crossed a threshold.

* * * * *